US 9,766,971 B2

(12) United States Patent
Boom

(10) Patent No.: US 9,766,971 B2
(45) Date of Patent: Sep. 19, 2017

(54) PHYSICAL LAYER DEVICE OPERATION SYSTEM AND METHOD

(71) Applicant: Intel Corporation, Santa Clara, CA (US)

(72) Inventor: Douglas D. Boom, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 99 days.

(21) Appl. No.: 14/959,440

(22) Filed: Dec. 4, 2015

(65) Prior Publication Data

US 2017/0161139 A1  Jun. 8, 2017

(51) Int. Cl.
*G06F 11/00* (2006.01)
*G06F 11/10* (2006.01)
*G06F 3/06* (2006.01)

(52) U.S. Cl.
CPC .......... *G06F 11/1004* (2013.01); *G06F 3/065* (2013.01); *G06F 3/0619* (2013.01); *G06F 3/0673* (2013.01)

(58) Field of Classification Search
USPC .......................................................... 714/42
See application file for complete search history.

(56) References Cited

U.S. PATENT DOCUMENTS

| 7,472,318 | B2* | 12/2008 | Fan | H04L 1/241 |
| | | | | 370/236.1 |
| 8,365,018 | B2* | 1/2013 | McIntosh | H04L 12/2697 |
| | | | | 709/224 |
| 8,832,513 | B2* | 9/2014 | Berry | G06F 15/00 |
| | | | | 375/224 |
| 2005/0111403 | A1 | 5/2005 | Rudolf et al. | |
| 2006/0034269 | A1 | 2/2006 | Taylor et al. | |
| 2008/0104264 | A1 | 5/2008 | Duerk et al. | |
| 2012/0246400 | A1 | 9/2012 | Bhadra et al. | |

FOREIGN PATENT DOCUMENTS

WO  WO2014-158171 A1  10/2014

OTHER PUBLICATIONS

International Search Report and Written Opinion mailed Jan. 26, 2017 for International Application No. PCT/US2016/058660, 15 pages.

* cited by examiner

*Primary Examiner* — Sarai Butler
(74) *Attorney, Agent, or Firm* — Schwabe, Williamson & Wyatt, P.C.

(57) ABSTRACT

Apparatuses, systems and methods associated with causing a physical layer (PHY) device are disclosed herein. In embodiments, an apparatus may include a memory device to store one or more activity lists associated with one or more external PHY devices, external to the apparatus, including the first external PHY device. The apparatus may further include a processor, that executes an engine, to receive a request for performance of the operation by the first external PHY device, identify an activity list associated with the first external PHY device from the one or more activity lists, identify an activity to effectuate performance of the operation from the activity list associated with the first external PHY device and cause the first external PHY device to perform the operation in accordance with the activity.

25 Claims, 7 Drawing Sheets

```
400
  ↓                              402
                                  ↓
        struct Activity_List_Header {    404
           UINT16      ID_Token;    ←
           UINT16      Size;  ←         406
                                         408
           UINT16      NumberofActivities; ←
           UINT16      Version;  ←
           UINT16      Checksum;  ←  410
        };
                                      412
```

FIGURE 4

```
500
  ↓              502
                  ↓ struct ToCEntry {
                                          504
                 UINT16 ActivityName;  ←
                 UINT16 ActivityLocation; ←  506
        }
```

FIGURE 5

PHYSICAL LAYER DEVICE OPERATION SYSTEM AND METHOD

TECHNICAL FIELD

The present disclosure relates to the fields of electronic circuits and computing. More particularly, the present disclosure relates to operation of a physical layer (PHY) device, e.g., within a computing device.

BACKGROUND

The background description provided herein is for the purpose of generally presenting the context of the disclosure. Unless otherwise indicated herein, the materials described in this section are not prior art to the claims in this application and are not admitted to be prior art by inclusion in this section.

Enablement of a PHY device within a computing device often involves communication between a media access controller (MAC) and the PHY device. In order for the communication to occur between the components, both the MAC and the PHY device must be communicating using the same programming construct. As no standard programming construct has been defined for communication between MACs and PHY devices, multiple different programming constructs may be utilized for communicating between MACs and PHY devices depending on the MACs and/or the PHY devices implemented.

In legacy computing devices, often the MAC and the PHY device were produced by different manufacturers who would develop the components without interaction between the manufacturers. The lack of interaction between the manufacturers would lead to the MAC and the PHY device communicating in a different programming construct from each other. In order to rectify this issue, the MAC manufacturer, the producer of the computing device and/or motherboard, and/or a third party would reprogram binary code within a driver associated with the PHY device to enable communication between the MAC and the PHY device. This approach was complicated, time consuming and costly to perform.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example, and not by way of limitation, in the figures of the accompanying drawings.

FIG. 4 illustrates an example activity list header structure, according to various embodiments.

FIG. 5 illustrates an example table of contents entry structure, according to various embodiments.

DETAILED DESCRIPTION

Figure 1:
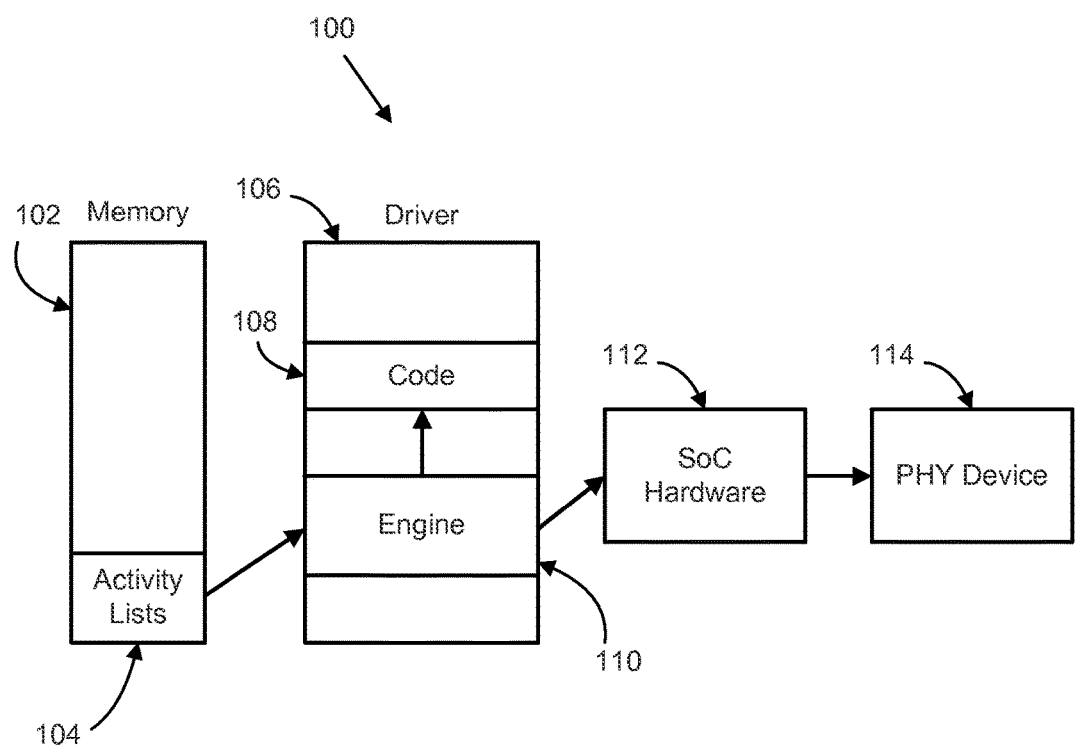
FIG. 1 illustrates an example communication flow among components of an example computing device, according to various embodiments.

Apparatuses, methods and storage medium associated with physical layer (PHY) device operation are disclosed herein. In embodiments, an apparatus may include one or more processors, devices, and/or circuitry to identify a PHY device and access an activity list associated with the PHY device. The apparatus may access activities within the activity list that enable communication between a media access controller (MAC) and the PHY device to initiate PHY-level tasks to be performed by the PHY device. The apparatuses, methods and storage medium disclosed herein may configure and control third party PHY devices without modifications to the driver binary.

In the following detailed description, reference is made to the accompanying drawings which form a part hereof wherein like numerals designate like parts throughout, and in which is shown by way of illustration embodiments that may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

Aspects of the disclosure are disclosed in the accompanying description. Alternate embodiments of the present disclosure and their equivalents may be devised without parting from the spirit or scope of the present disclosure. It should be noted that like elements disclosed below are indicated by like reference numbers in the drawings.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B and C).

For the purposes of the present disclosure, the phrase "user" is not limited to an individual. The phrase "user" may be interpreted as an entity, a corporation, a group of individuals, or some combination thereof.

The description may use the phrases "in an embodiment," "in embodiments," or "in some embodiments," which may each refer to one or more of the same or different embodiments. Furthermore, the terms "comprising," "including," "having," and the like, as used with respect to embodiments of the present disclosure, are synonymous.

As used herein, the term "circuitry" may refer to, be part of, or include an Application Specific Integrated Circuit (ASIC), an electronic circuit, a processor (shared, dedicated, or group) and/or memory (shared, dedicated, or group) that execute one or more software or firmware programs, a combinational logic circuit, and/or other suitable components that provide the described functionality.

Referring now to FIG. 1, wherein an example communication flow among components of an example computing device 100, according to various embodiments, is shown. As illustrated, an apparatus according to embodiments may include a memory device 102, a system on a chip (SoC) device including a driver 106 and SoC hardware, a PHY device 114, or some combination thereof. The memory device 102, the SoC device and the PHY device 114 may be coupled to each other such that each device is able to communicate with the other devices.

The memory device 102 may include a non-volatile memory device, a volatile memory device, memory residing on the SoC device, a memory device external to the SoC device, a random-access memory (RAM) device, a read-only memory (ROM) device, or some combination thereof. The memory device 102 may store one or more activity lists 104 that enable the SoC device to communicate with the PHY device 114 to cause the PHY device 114 to perform a PHY-level task. Each of the activity lists 104 may be associated with a PHY device, a type of PHY device, a programming construct for communicating with one or more PHY devices, a SoC device, a type of SoC device, a MAC residing on the SoC device, a type of MAC residing on the SoC device, or some combination thereof. Each activity list may include one or more activities, wherein each activity may cause the PHY device to perform a PHY-level task in response to execution of the activity.

A driver 106 may communicate with the memory device 102 and may access the one or more activity lists 104 stored on the memory device 102. The driver 106 may reside on the SoC device. The driver may reside in what would commonly be called firmware and may include a firmware driver. In some embodiments, the driver 106 may reside external to the SoC device and be coupled to the SoC device such that the driver 106 may communicate with the SoC device and/or vice versa.

The driver may be software to enable the SoC device to communicate with the PHY device 114. Execution of a portion of the software may cause the PHY device 114 to perform a PHY-level task. The driver 106 may include a firmware driver, a device driver, or some combination thereof. The driver 106 may be associated with the SoC device, the PHY device, or some combination thereof.

The driver 106 may include a processing engine 110. The processing engine 110 may have been installed on the apparatus with the driver, may have been added to the driver after installation of the driver, may have replaced and/or altered code within the driver to generate the processing engine 110, or some combination thereof. In some embodiments, the processing engine 110 may be separate from the driver 106 and coupled to the driver 106.

The processing engine 110 may identify the PHY device 114, a programming construct to be utilized for communicating with the PHY device 114, a MAC of the SoC device, or some combination thereof. The identification of the PHY device 114 may include receiving, by the processing engine, a PHY device identifier associated with the PHY device 114. The PHY device identifier may be received in a request for the PHY device to perform some PHY-level task. The processing engine 110 may access the activity lists 104 stored on the memory device 102 and may determine which of the activity lists 104 should be utilized for communicating with the PHY device 114 based the identified PHY device 114, the programming construct, the MAC, or some combination thereof.

The driver 106 may receive a request for performance of a PHY-level task from the SoC device and/or the PHY device 114. The processing engine 110 may utilize the request to determine which PHY-level task for which performance is being requested. The processing engine 110 may utilize the identified PHY-level task to identify one of the activities associated with the PHY-level task within the activity list that should be utilized for communicating with the PHY device 114. The activity associated with the PHY-level task may cause the PHY device 114 to perform the PHY-level task when executed.

The processing engine 110 may operate in combination with the code portion 108 of the driver 106. The processing engine 110 may utilize the code portion 108 of the driver 106 to translate the activity into one or more commands in a programming construct that can be read by the PHY device 114. The code portion 108 may provide for translation of the activity into a specific programming construct, such as MDI code and/or I2C code. In some examples, the activity may be translated into PHY commands, MAC commands, or some combination thereof.

The one or more commands produced through the translation may be communicated by SoC hardware 112 to the PHY device 114. The PHY device 114 may be located external to the SoC device, including the SoC hardware 112. The one or more commands may be communicated from the SoC hardware 112 to the PHY device 114 via one or more busses, including an advanced graphics port, an enhanced integrated drive electronics type bus, an extended industry standard architecture bus, an IEEE 1394 compliant bus, a personal computer memory card international association compliant bus, a peripheral component interconnect bus, a small computer system interface bus, a universal serial bus, a parallel port, a PS/2 port, a serial port, or some combination thereof. The one or more commands may cause the PHY device 114 to perform a PHY-level task associated with the activity. In some examples, the PHY device 114 may transmit a confirmation signal back to the SoC hardware 112 indicating that the PHY-level task has been completed.

Figure 2:
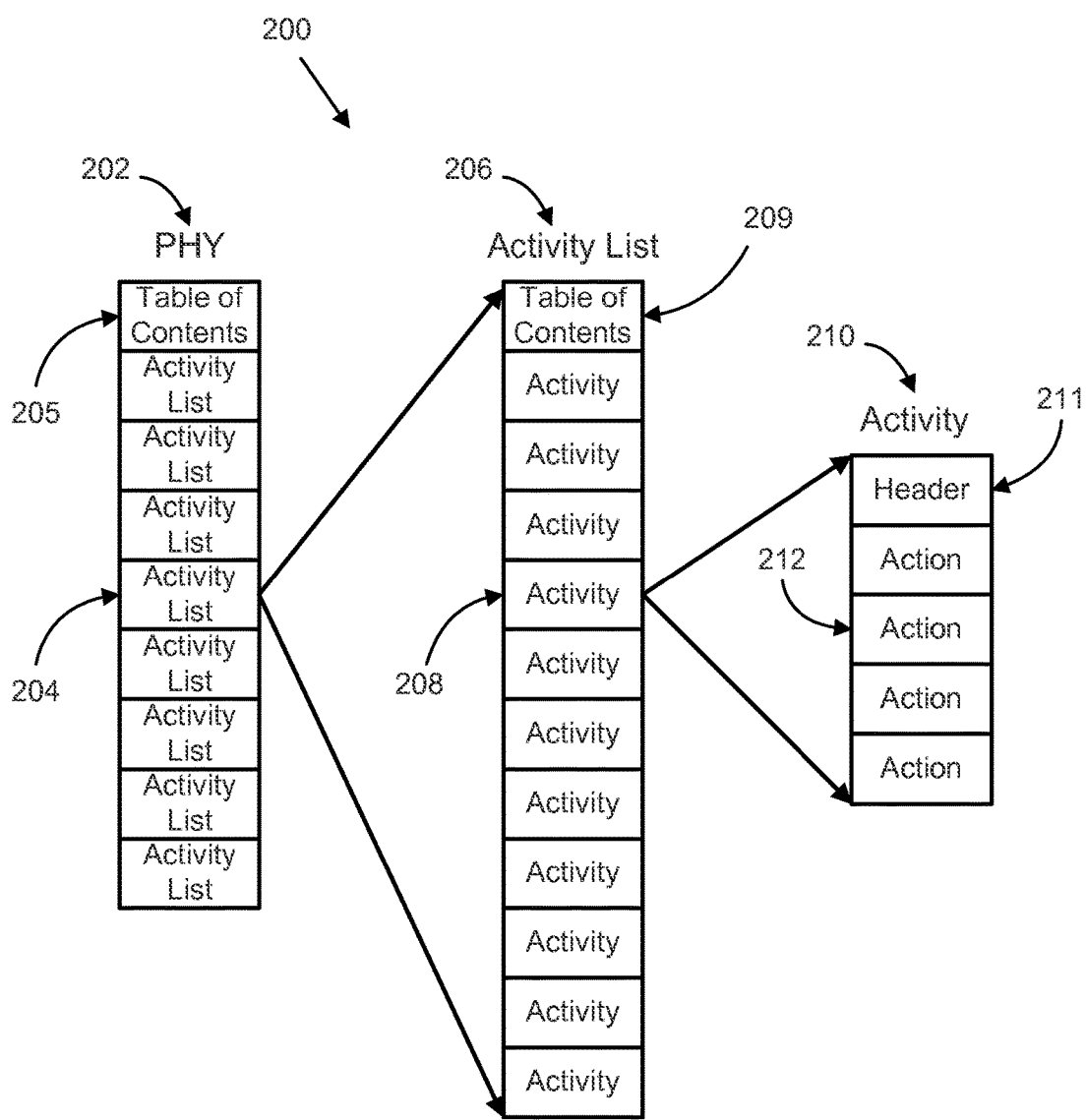
FIG. 2 illustrates an example abstract representation of computing structures utilized for PHY enablement, according to various embodiments.

Referring now to FIG. 2, wherein a representation of computing structures utilized for PHY operation, according to various embodiments, is shown. The computing structures may be stored in a PHY activity lists portion 202 of a memory device, such as the memory device 102 of FIG. 1 that stores the one or more activity lists 104 in a portion of the memory device 102.

The PHY activity lists portion 202 may include one or more activity lists, including activity list 204. The one or more activity lists may have similar features to other activity lists described throughout this disclosure, including the activity lists 104 of FIG. 1. Each activity list may be associated with a PHY device, a type of PHY device, a programming construct utilized for communicating with a type of PHY device, a SoC device, a MAC device, or some combination thereof. The activity lists may be utilized for communication between a SoC device and a PHY device.

The PHY activity lists portion 202 may further include a table of contents 205 associated with the one or more activity lists. The table of contents 205 may be utilized to determine which one of the activity lists should be utilized for communication between the SoC device and the PHY device based on the PHY device, the programming construct, the SoC device, and/or the MAC. A processing engine, such as processing engine 110 of FIG. 1, may access the table of contents 205 and perform the determination. The table of contents 205 may further indicate a storage location of each of the activity lists in the memory device. In other embodiments, another means of determining which one of the activity lists should be utilized may be performed, such as by comparing some identifying factor of the PHY device with data included in the activity list 204.

In some embodiments, in response to the computing device determining which one of the activity lists should be utilized for communication between the SoC device and the PHY device, the activity list, or a copy thereof, may be stored in a different location, from where initially accessed, within the computing device allowing for quicker access to the activity list. For example, when the one or more activity lists are stored on a memory device separate from the SoC device, a copy of the activity list to be utilized may be stored in a memory of the SoC device allowing for quicker access to the activity list by the SoC device.

Expanded activity list representation 206 is a representation of the activity list 204 showing contents of the activity list 204. The expanded activity list representation 206 may be representative of one, all or some portion of the activity lists stored in the PHY activity lists portion 202.

The activity list 204 may include one or more activities, including activity 208, as shown in exampled activity list representation 206. Each of the activities within the activity list 204 may be associated with a PHY-level task to be performed by a PHY device associated with the activity list 204. In some embodiments, the activity list 204 may be limited to activities for making the PHY device operational, while other activities that are not for making the PHY device operational may be excluded from the activity list 204.

The activity list 204 may include a table of contents 209. The table of contents 209 may include data for identifying which activity is associated with which PHY-level task. The processing engine may access the table of contents 209 and may identify an activity from the activity list 204, associated with a desired PHY-level task, to be performed by the PHY device based on the data included in the table of contents 209. The table of contents 209 may further indicate a location of each of the activities within the activity list 204.

Expanded activity representation 210 is a representation of activity 208. The expanded activity representation 210 may be representative of one, all or some portion of the activities within the activity list 204.

The activity 208 may include one or more actions, including action 212, and a header 211. The header 211 may include one or more of the features described in relation to activity header structure 900 below. Each action may include code to cause a PHY device, such as PHY device 114 of FIG. 1, to perform a portion of a PHY-level task associated with the activity 208. The actions may cause the PHY device to perform a PHY-level task associated with the activity 208 in response to a SoC device executing the actions. The SoC device may begin execution of the activity by executing the first action within the activity and progressively executing the actions within the activity until the last action within the activity is executed. In some embodiments, the SoC device may begin execution at the first action and may execute a specified number of actions after the first action, regardless of the number of actions within the activity 208.

Further, the activity list 204 may include a table of contents identifying a location of the activities within the corresponding activity list, a number of the activities within the corresponding activity list, a length of the activities within the activity list, a PHY-level task associated with each of the activities, or some combination thereof. In some embodiments, the table of contents may be located in a memory location between a header of the activity list and a first activity within the activity list.

In some embodiments, each activity list of the activity lists 104 may include a checksum value used for performing a checksum operation. The checksum operation may be performed on the checksum value to verify that the corresponding activity list has not been corrupted, has not been altered by an unauthorized user, or some combination thereof. The checksum operation may be performed in response to the computing device determining that the activity list is to be utilized for communication with the PHY device, the computing device accessing the activity list, or some combination thereof.

Figure 3:
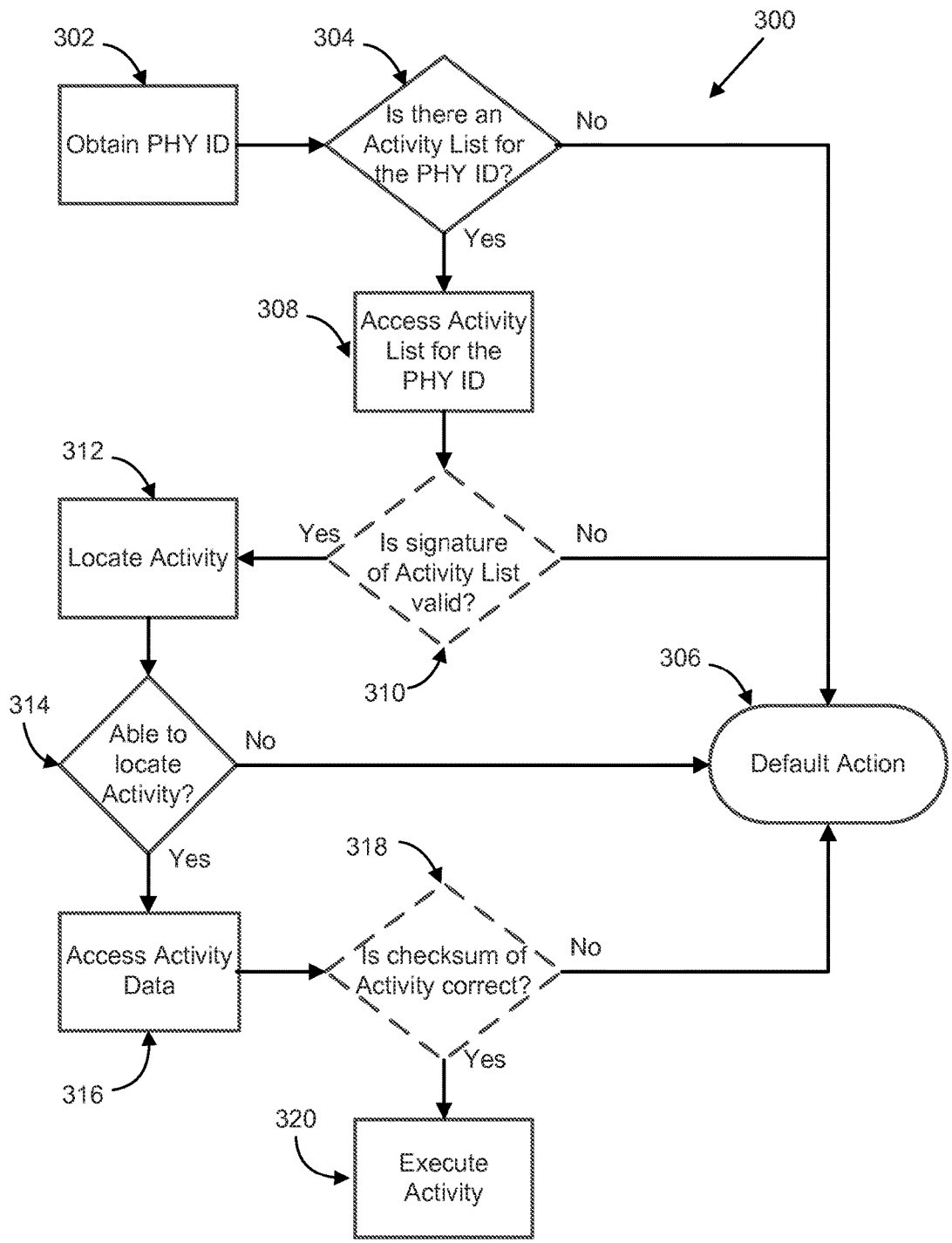
FIG. 3 illustrates an example process of PHY enablement, according to various embodiments.

Referring now to FIG. 3, wherein a process 300 of PHY operation, according to various embodiments, is shown. The process 300 may start in block 302, wherein a PHY device identifier may be obtained. The PHY device identifier may identify a PHY device, such as PHY device 114 of FIG. 1. The PHY device identifier may be obtained by a SoC device, such as the SoC device of FIG. 1 encompassing the driver 106 and the SoC hardware 112, and may be obtained in response to receiving a request for the PHY device to perform a PHY-level task, detecting that the PHY device is newly installed, initialization of the PHY device, the computing device being turned on, initialization of the computing device, driver startup, or some combination thereof.

Once the PHY device identifier has been obtained, the process 300 may proceed to block 304 where the SoC device determines if there is an activity list associated with the PHY device identifier stored in a memory device accessible by the SoC device and which of the activity lists stored within the memory device is associated with the PHY device. Determining whether there is an activity list and which activity list is associated with the PHY device may be performed in accordance with any of the processes described throughout this disclosure, including the process of the SoC device accessing a table of contents, such as table of contents 205 of FIG. 2, to determine which activity list is associated with the PHY device.

In response to the SoC device determining that there is not an activity list associated with the PHY device identifier stored within the memory device, the process 300 may proceed to block 306, where a default action is performed. The default action may include causing the computing device to display on a display device, coupled to the computing device, a message that the PHY-level task cannot be performed. In some embodiments, the default action may include performing a default PHY-level task, including displaying an indication on the PHY device that the PHY-level task cannot be performed, causing the PHY device and/or the SoC device to continue operation with a subsequent PHY-level task rather than waiting for completion of the current PHY-level task, reinitializing the PHY device, proceeding to block 302 to obtain that the PHY device identifier and continue operation from block 302, or some combination thereof.

In response to the SoC device identifying which activity list is associated with the PHY device, the process 300 may proceed to block 308, where the activity list associated with the PHY device is accessed by the SoC device. In some embodiments, accessing the activity list may include generating a copy of the activity list in a local memory of the SoC device for quicker access to the activity list.

After accessing the activity list, the process 300 may proceed to block 310, where a signature of the activity list is checked in order to verify that the activity list is valid. The signature of the activity list may be located in a header of the activity list. The signature may indicate a user who created of the activity list, a user who modified the activity list, a software program that created and/or modified the activity list, an address (such as an internet protocol address) of a user who created and/or modified the activity list, or some combination thereof. The SoC device may compare the signature to a list of trusted signature to verify that the activity list was created and/or modified by a trusted party.

In some embodiments, the signature may include a checksum value. Verification that the activity list is valid may include performing a checksum calculation on the checksum value. If the result of the checksum calculation is that the checksum value is the expected value, the activity list may be determined to be valid.

In other embodiments, the activity list may not include a signature. In these embodiments, the process may surpass block 310 and proceed directly from block 308 to block 312.

If the activity list is determined to be invalid based on the signature, the process 300 may proceed to block 306, where the default action is performed. If the activity list is determined to be valid, the process 300 may proceed to block 312 where the SoC device locates an activity within the activity list that is associated with the PHY-level task. Location of the activity may involve comparing an identifying feature of the PHY-level task with data within each activity to determine which activity is associated with the PHY-level task.

In some embodiments, the activity list may include a table of contents, such as table of contents 209 of FIG. 2. The SoC device may access the table of contents and utilize data stored in the table of contents to determine which activity is associated with the PHY-level task. The table of contents may further include an indication of where each activity is located within the memory device, the local memory of the SoC device, or some combination thereof. The SoC device may utilize the indication of where each activity is located to access activity data included in the activity.

The process 300 may proceed to block 314, where the SoC device determines if it is able to locate the activity within the activity list. If the SoC device is unable to locate the activity within the activity list, the process 300 may proceed to block 306 where the default action is performed.

If the SoC device is able to locate the activity within the activity list, the process 300 may proceed to block 316, where the activity data included in the activity is accessed by the SoC device. The activity data may include an activity header, one or more actions, or some combination thereof. The activity data may include the features described in relation to the expanded activity representation 210 of the activity 208, illustrated in FIG. 2.

The SoC device may start accessing the activity by proceeding to a header of the activity. The header of the activity may include data associated with the contents of the activity, including a checksum value.

The process 300 may proceed to block 318, where a checksum operation is performed on the checksum value included in the header of the activity. The checksum operation may be performed to verify that the activity has not been corrupted. The checksum operation may include a parity byte and/or parity word checksum operation, a modular checksum operation, a position-dependent checksum operation, or some combination thereof. In some embodiments, the checksum operation may include a CRC8 checksum operation. The CRC8 checksum operation may utilize the polynomial expression $X^8+X^2+X^1+X^0$, or 0x07 in normal polynomial representation.

If the checksum operation indicates that the activity has been corrupted (i.e. the checksum value is not an expected value), the process 300 may proceed to block 306 where the default action is performed. If the checksum operation indicates that the activity has not been corrupted (i.e. the checksum value is the expected value), the process 300 may proceed to block 320 where the activity is executed.

In some embodiments, the header may not include a checksum value. Further, in some embodiments, the activity may not include a header. In some embodiments where the activity does not include a header and/or a checksum value, the process 300 may exclude block 318 and may proceed directly from block 316 to block 320. In these embodiments, the SoC device may proceed directly to the first action of the activity list in response to accessing the activity.

In block 320, the SoC device may execute the activity. In response to execution of the activity, the SoC device may cause the PHY device to perform the PHY-level task. Execution of the activity may include any of the processes of executing an activity, including the process described in FIG. 1 performed by the driver 106 and the SoC hardware 112. In particular, execution of the activity may involve translating the actions included in the activity list into one or more commands in a programming construct associated with the PHY device, where the PHY device performs the PHY-level task in response to executing the commands. The actions included in the activity may be translated into one or more PHY commands, MAC commands, or some combination thereof.

Referring now to FIG. 4, wherein an activity list header structure 400, according to various embodiments, is shown. The activity list header structure 400 may be included in an activity list, such as any of the activity lists in the activity lists 104 of FIG. 1 and/or the activity list 204 of FIG. 2. The activity list header structure 400 may be located at the beginning of an activity list, prior to a table of contents and activities within the activity list, or some combination thereof. The activity list header structure 400 may be a structure array data type. The activity list header structure 400 may include a unique activity list name 402.

The activity list header structure 400 may include an identifier token 404. The identifier token 404 may be a 16-bit unsigned integer. The identifier token 404 may be associated with a PHY device, a type of PHY device, a programming construct for communicating with one or more PHY devices, a SoC device, a type of SoC device, a MAC residing on the SoC device, a type of MAC residing on the SoC device, or some combination thereof.

In some embodiments, the identifier token 404 may be utilized for determining which activity list should be utilized in communicating with a PHY device. A SoC device may perform a comparison of a PHY device identifier, such as the PHY device identifier described in relation to block 302 of FIG. 3, with the identifier token being used to determine if the activity list should be utilized in communicating with the PHY device.

The activity list header structure 400 may include an activity list size indicator 406. The activity list size indicator may be a 16-bit unsigned integer. The activity list size may indicate an amount of memory space occupied by the activity list, an amount of memory space occupied by each activity within the activity list, or some combination thereof.

The activity list header structure 400 may include a number of activities indicator 408. The number of activities indicator 408 may be a 16-bit unsigned integer. The number of activities indicator 408 may indicate a number of activities within the activity list for which the activity list header structure is associated.

The activity list header structure 400 may include a version indicator 410. The version indicator 410 may be a 16-bit unsigned integer. The version indicator 410 may indicate a version of the activity list in which the activity list header structure 400 is included. The version indicator 410 may be incremented and/or updated in another matter in response to the activity list being updated and/or amended. In some embodiments, the version indicator 410 may further indicate the user that generated the updated version of the activity list, a software program that generated the updated version of the activity list, or some combination thereof.

The activity list header structure 400 may include a checksum value 412. A checksum operation may be performed on the checksum value 412 in order to verify that the activity list has not been corrupted. The checksum operation may be performed in accordance with any of the checksum operations described throughout this disclosure, including the checksum operation described in relation to the activity lists 104 of FIG. 1 and/or the checksum operation performed in relation to block 310 of FIG. 3.

Referring now to FIG. 5, wherein a table of contents entry structure 500, according to various embodiments, is shown. The table of contents entry structure 500 may be included in an activity list, such as any of the activity lists in the activity lists 104 of FIG. 1 and/or the activity list 204 of FIG. 2. The table of contents entry structure 500 may be located after a header of the activity list and prior to activities within the activity list. The table of contents entry structure 500 may be a structure array data type. The table of contents entry structure 500 may include a unique table of contents entry name 502.

The table of contents entry structure 500 may include an activity name 504. The activity name 504 may be associated with an activity to be performed by a PHY device. The activity name 504 may be a 16-bit unsigned integer.

The table of contents entry structure 500 may include an activity location 506. The activity location 506 may be a 16-bit unsigned integer. The activity location 506 may indicate a location in memory at which the activity is located, a location of the activity relative to beginning and/or end of the activity list, or some combination thereof.

Figure 6:
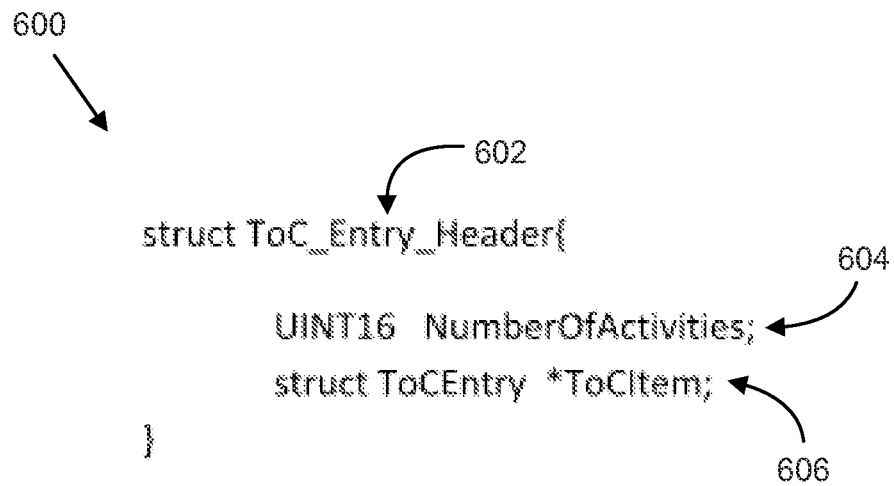
FIG. 6 illustrates an example table of contents entry header structure, according to various embodiments.

Referring now to FIG. 6, wherein a table of contents entry header structure 600, according to various embodiments, is shown. The table of contents entry header structure 600 may be included in an activity list, such as any of the activity lists in the activity lists 104 of FIG. 1 and/or the activity list 204 of FIG. 2. The table of contents entry header structure 600 may be a structure array data type. The table of contents entry header structure 600 may include a unique header name 602.

The table of contents entry header structure 600 may include a number of activities indication 604. The number of activities indication 604 may be a 16-bit unsigned integer data type. The number of activities indication 604 may indicate a number of the activities within the activity list.

The table of contents entry header structure 600 may include a table of contents item pointer 606. The table of contents item pointer 606 may define a pointer of the type of the table of contents entry structure 500. Accordingly, the table of contents item pointer 606 may point to a table of contents entry within memory, wherein the table of contents entry includes both an activity name, such as the activity name 504 of FIG. 5, and an activity location, such as the activity location 506 of FIG. 5. As access to the table of contents by a SoC device progresses through the table of contents, the table of content item pointer 606 may be progressively incremented to a next activity entry in the table of contents until the SoC device identifies the activity associated with a desired PHY-level task to be performed by a PHY device and/or the SoC device has accessed all the activity entries within the table of contents.

Figure 7:
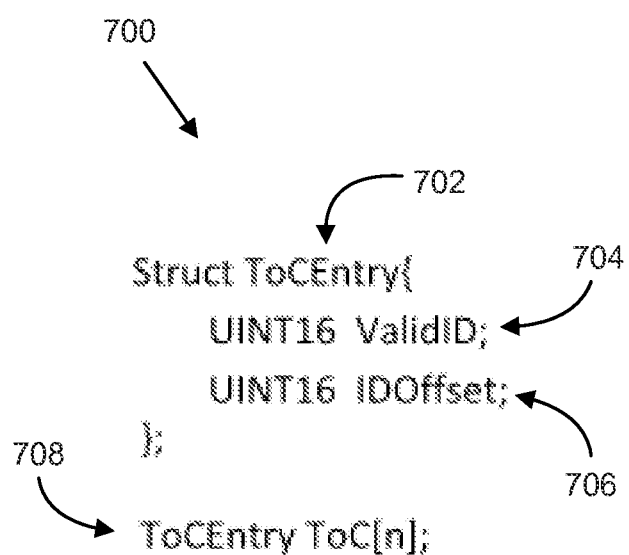
FIG. 7 illustrates another example table of contents entry structure, according to various embodiments.

Referring now to FIG. 7, wherein another table of contents entry structure 700, according to various embodiments, is shown. This table of contents entry structure 700 may be easier to process than table of contents entry structure 500. Accordingly, table of contents entry structure 700 may be utilized for computing devices and/or SoC devices with limited abilities. The table of contents entry structure 700 may be included in an activity list, such as any of the activity lists in the activity lists 104 of FIG. 1 and/or the activity list 204 of FIG. 2. The table of contents entry structure 700 may be located after a header of the activity list and prior to activities within the activity list. The table of contents entry structure 700 may be a structure array data type. The table of contents entry structure 700 may include a unique table of contents entry name 702.

The table of contents entry structure 700 may include a validity identifier 704. The validity identifier 704 may be a 16-bit unsigned integer. The validity identifier 704 may be utilized to verify that a table of contents entry is a valid entry.

The table of contents entry structure 700 may include an identifier offset 706. The identifier offset 706 may be a 16-bit unsigned integer. The identifier offset 706 may indicate an offset amount that a first activity is after a header of the activity list.

Figure 8:
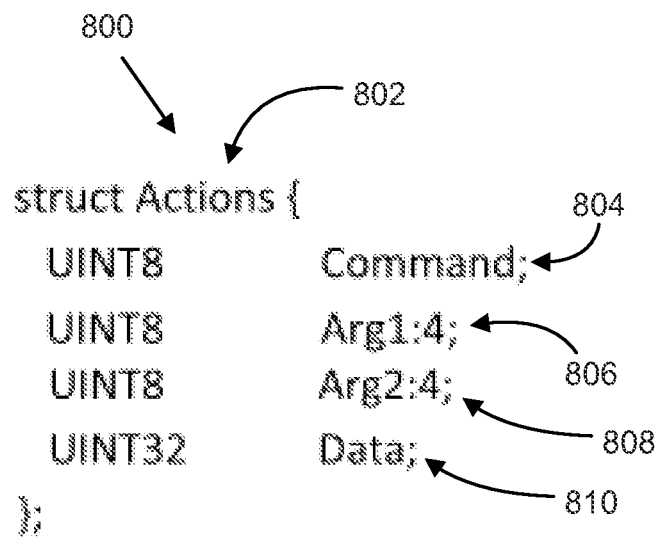
FIG. 8 illustrates an example action structure, according to various embodiments.

Referring now to FIG. 8, wherein an action structure 800, according to various embodiments, is shown. The action structure 800 may define an action, such as action 212 of FIG. 2. The action structure 800 may be a structure array data type. The action structure 800 may include a unique action name 802.

The action structure 800 may include a command field 804. The command field 804 may be an 8-bit unsigned integer. The command field 804 may include a command to execute a certain function. The command within the command field 804 may be a MAC command and/or a PHY command. The command field 804 may include a hardware level command, such as a load command, a swap command, a copy command, a test command, a less than comparison command, a greater than comparison command, an equal to comparison command, a jump command, a nested jump command, an unconditional jump command, a read from multi-media domain (MMD) command, a read from I2C bus command, a read from multiple document interface (MDI) command, a write to MMD command, a write to I2C bus command, a write to MDI command, an increment command, a decrement command, an logic or command, a logic and command, a logical not command, a write to MAC command, a read to MAC command, a mathematical add command, a right shift command, a left shift command, a wait command, a version print command, and/or a RET command (placing a return address in an instruction pointer of the computing device).

The action structure 800 may include a first argument 806 and a second argument 808 associated with the command field 804. The first argument 806 and the second argument 804 may each comprise an 8-bit unsigned integer. The first argument 806 and the second argument 808 may be used to indicate parameter usage for the command field 804. For most actions, arguments may denote source and destination for the operation being performed by the action. For example, the first argument 806 could be "Use Internal Register A as source" and the second argument 808 could be "Use Internal Register B as destination" if the command field 804 is "Copy". In other embodiments, either or both of the first argument 806 and the second argument 808 may be "no argument". The value and use of the first argument 806 and second argument 808 may be dependent of the value and design of the command field 804. Further, some examples of the first argument 806 and/or the second argument 808 may include "Use immediate data" (which may be a reference to data within a data field 810), use Internal Register C or Internal Register D. The command field 804 may determine what the first argument 806 and/or the second argument 808 are in context.

The action structure 800 may include the data field 810. The data field 810 may be a 32-bit unsigned integer. The data within the data field 810 may be used by the command field 804 if directed so by either or both of the first argument 806 and the second argument 808. While other embodiments may use two (or more) data fields, such as data field 810, one is shown here for clarity and, in practice, may be all that is desired. Data fields may not always used, although may be maintained for uniformity of the action structure 800 and/or prospective use at another time.

Figure 9:
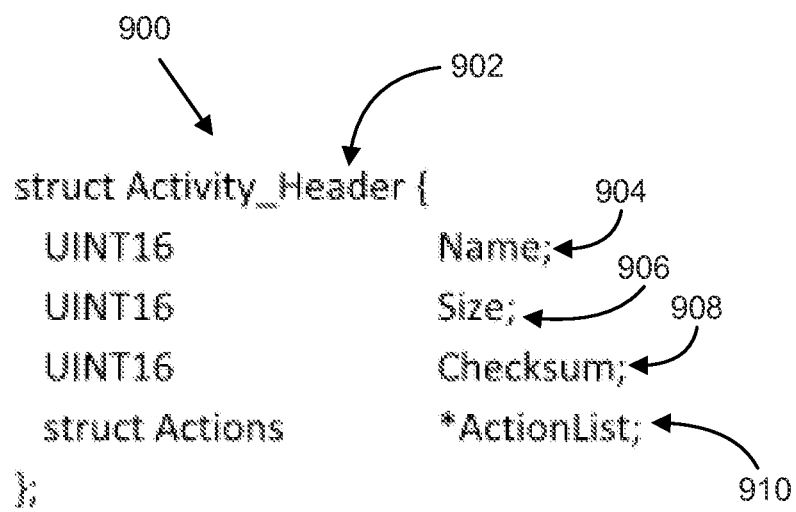
FIG. 9 illustrates an example activity header structure, according to various embodiments.

Referring now to FIG. 9, wherein an activity header structure 900, according to various embodiments, is shown. The activity header structure 900 may be included in an activity, such as activity 208 of FIG. 2. The activity header structure 900 may be located at a beginning of the activity, prior to any actions within the activity. The activity header structure 900 may be a structure array data type. The activity header structure 900 may include a unique activity header name 902.

The activity header structure 900 may include an activity name 904. The activity name 904 may be a 16-bit unsigned integer. The activity name 904 may indicate a PHY-level operation to be performed by a PHY device.

The activity header structure 900 may include a size indication 906. The size indication 906 may be a 16-bit unsigned integer. The size indication 906 may indicate a size of the activity. The size indication 906 may indicate an amount of actions (such as action 212 of FIG. 2) within the activity, an amount of memory occupied by the activity, an amount of memory occupied by each action within the activity, or some combination thereof.

The activity header structure 900 may include a checksum value 908. The checksum value 908 may be a 16-bit unsigned integer. A checksum operation may be performed with the checksum value 908 to verify that the activity has not been corrupted. The checksum operation may include any of the checksum operations described throughout this disclosure, such as the checksum operation described in block 318 of FIG. 3.

The activity header structure 900 may include an action pointer 910. The action pointer 910 may be an action structure as defined by the action structure 800 of FIG. 8. The action pointer 910 may be initialized to point to a storage location of a first action within the action list. As the activity is executed, the action pointer 910 may increment to point to a storage location of the next action in response to the current action being completed. Each action within the action list may be the same size, such that each time the action pointer 910 increments to the next action the action pointer 910 increments by a same amount of memory locations for each increment. The action pointer 910 may be continually incremented through the actions within the activity until the last action within the activity is executed, at which point the action pointer 910 may be directed to point to the storage location of the first action within the activity.

In some embodiments, the action pointer 910 may be prevented from pointing to a memory location outside of the current activity. The current activity may be defined to be certain size based on the size indication 906. The current activity may be defined as being a size indicated by the size indication 906 and may be measured as the indicated size from the first memory location of the activity, from the first memory location of the activity header, from the after the last memory location of the activity header, or some combination thereof.

In response to an action within the activity attempting to address the action pointer 910 to a location outside of the current activity, the SoC device may determine that the activity has been corrupted. The SoC device may prevent performance of any further actions, including the contents of the location outside of the current activity to which the action pointer 910 is attempting to be addressed, in response to the determination that the activity has been corrupted. Further, the SoC device may perform a default action, such as the default action described in relation to block 306 of FIG. 3, in response to the determination that the activity has been corrupted.

In other embodiments, the SoC device may ignore any attempts to address the action pointer 910 to a location outside of the current activity and continue incrementing the action pointer 910 to the storage location of the next action within the current activity. The SoC device may continue to perform the actions within the current activity as the action pointer 910 is incremented through the actions within the current activity without addressing the action pointer 910 to the location outside of the current activity and/or performing the activity associated with the location outside of the current activity.

Figure 10:
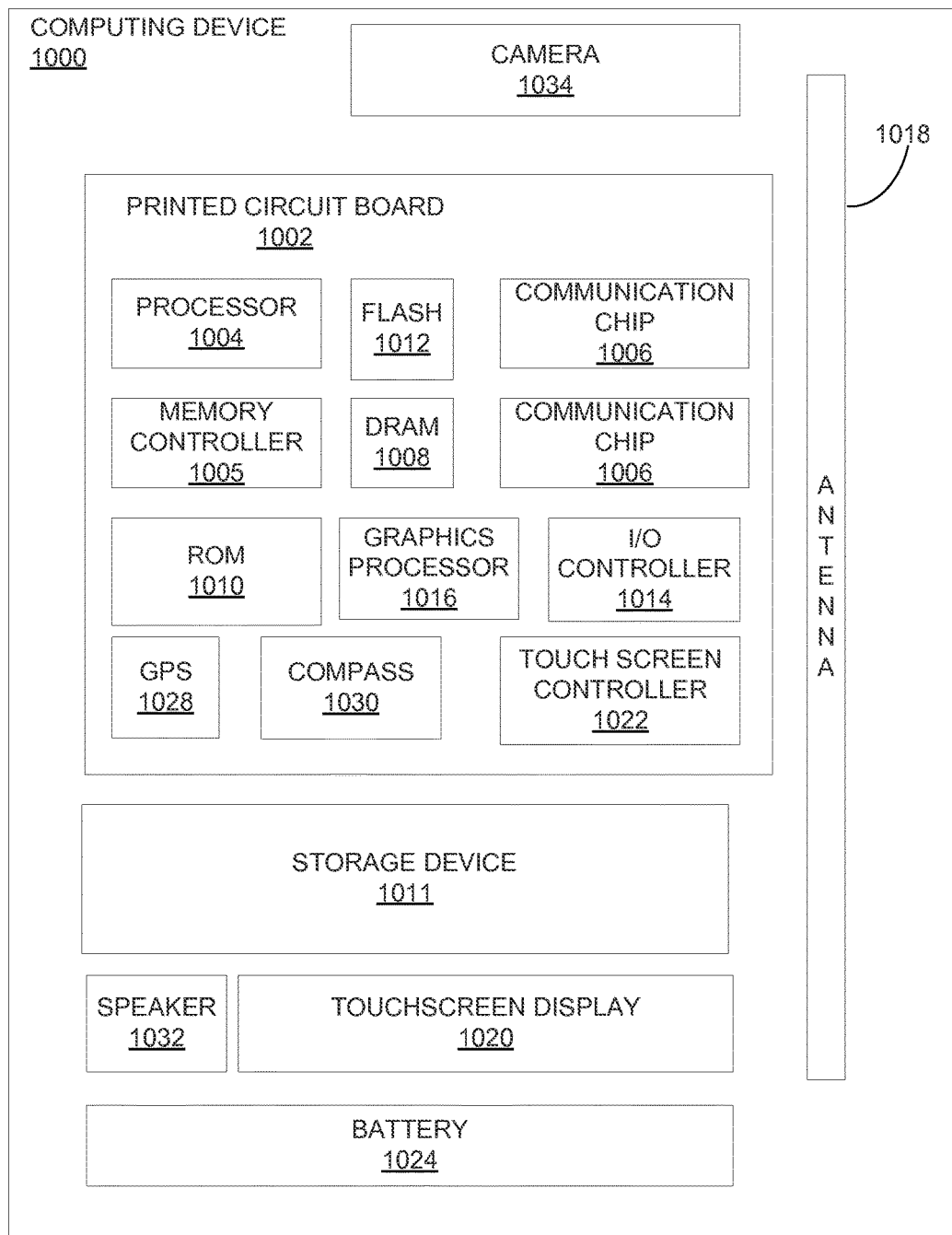
FIG. 10 illustrates an example computing device that may employ the apparatuses and/or methods described herein.

FIG. 10 illustrates an example computing device 1000 that may employ the apparatuses and/or methods described herein (e.g., memory 102, driver 106, SoC hardware 112, PHY device 114 and process 300), in accordance with various embodiments. As shown, computing device 1000 may include a number of components, such as one or more processor(s) 1004 (one shown) and at least one communication chip 1006. In various embodiments, the one or more processor(s) 1004 each may include one or more processor cores. In various embodiments, the at least one communication chip 1006 may be physically and electrically coupled to the one or more processor(s) 1004. In further implementations, the communication chip 1006 may be part of the one or more processor(s) 1004. In various embodiments, computing device 1000 may include printed circuit board (PCB) 1002. For these embodiments, the one or more processor(s) 1004 and communication chip 1006 may be disposed thereon. In alternate embodiments, the various components may be coupled without the employment of PCB 1002.

Depending on its applications, computing device 1000 may include other components that may or may not be physically and electrically coupled to the PCB 1002. These other components include, but are not limited to, memory controller 1005, volatile memory (e.g., dynamic random access memory (DRAM) 1008), non-volatile memory such as read only memory (ROM) 1010, flash memory 1012, storage device 1011 (e.g., a hard-disk drive (HDD)), an I/O controller 1014, a digital signal processor (not shown), a crypto processor (not shown), a graphics processor 1016, one or more antenna 1018, a display (not shown), a touch screen display 1020, a touch screen controller 1022, a battery 1024, an audio codec (not shown), a video codec (not shown), a global positioning system (GPS) device 1028, a compass 1030, an accelerometer (not shown), a gyroscope (not shown), a speaker 1032, a camera 1034, and a mass storage device (such as hard disk drive, a solid state drive, compact disk (CD), digital versatile disk (DVD)) (not shown), and so forth.

In some embodiments, the one or more processor(s) 1004, flash memory 1012, and/or storage device 1011 may include associated firmware (not shown) storing programming instructions configured to enable computing device 1000, in response to execution of the programming instructions by one or more processor(s) 1004, to practice all or selected aspects of the methods described herein. In various embodiments, these aspects may additionally or alternatively be implemented using hardware separate from the one or more processor(s) 1004, flash memory 1012, or storage device 1011.

In various embodiments, one or more components of the computing device 1000 may include the memory device 102, the driver 106, the SoC hardware 112 and/or the PHY device 114 described herein. For example, the memory device 102, the driver 106, the SoC hardware 112 and/or the PHY device 114 may be included in I/O controller 1014, processor 1004, memory controller 1005, and/or another component of computing device 1000. In some embodiments, I/O controller 1014 may interface with one or more external devices to receive a data signal using the memory device 102, the driver 106, the SoC hardware 112 and/or the PHY device 114. Additionally, or alternatively, the memory device 102, the driver 106, the SoC hardware 112 and/or the PHY device 114 may be used to receive a data signal transmitted between two components of the computing device 1000.

The communication chips 1006 may enable wired and/or wireless communications for the transfer of data to and from the computing device 1000. The term "wireless" and its derivatives may be used to describe circuits, devices, systems, methods, techniques, communications channels, etc., that may communicate data through the use of modulated electromagnetic radiation through a non-solid medium. The term does not imply that the associated devices do not contain any wires, although in some embodiments they might not. The communication chip 1006 may implement any of a number of wireless standards or protocols, including but not limited to IEEE 702.20, Long Term Evolution (LTE), LTE Advanced (LTE-A), General Packet Radio Service (GPRS), Evolution Data Optimized (Ev-DO), Evolved High Speed Packet Access (HSPA+), Evolved High Speed Downlink Packet Access (HSDPA+), Evolved High Speed Uplink Packet Access (HSUPA+), Global System for Mobile Communications (GSM), Enhanced Data rates for GSM Evolution (EDGE), Code Division Multiple Access (CDMA), Time Division Multiple Access (TDMA), Digital Enhanced Cordless Telecommunications (DECT), Worldwide Interoperability for Microwave Access (WiMAX), Bluetooth, derivatives thereof, as well as any other wireless protocols that are designated as 3G, 4G, 5G, and beyond. The computing device 1000 may include a plurality of communication chips 1006. For instance, a first communication chip 1006 may be dedicated to shorter range wireless communications such as Wi-Fi and Bluetooth, and a second communication chip 1006 may be dedicated to longer range wireless communications such as GPS, EDGE, GPRS, CDMA, WiMAX, LTE, Ev-DO, and others.

In various implementations, the computing device 1000 may be a laptop, a netbook, a notebook, an ultrabook, a smartphone, a computing tablet, a personal digital assistant (PDA), an ultra-mobile PC, a mobile phone, a desktop computer, a server, a printer, a scanner, a monitor, a set-top box, an entertainment control unit (e.g., a gaming console or automotive entertainment unit), a digital camera, an appliance, a portable music player, or a digital video recorder. In further implementations, the computing device 1000 may be any other electronic device that processes data.

It will be apparent to those skilled in the art that various modifications and variations can be made in the disclosed embodiments of the disclosed device and associated methods without departing from the spirit or scope of the disclosure. Thus, it is intended that the present disclosure covers the modifications and variations of the embodiments disclosed above provided that the modifications and variations come within the scope of any claims and their equivalents.

Example 1 may include an apparatus to cause a first external physical layer (PHY) device, external to the apparatus, to perform an operation. The apparatus may include a memory device to store one or more activity lists associated with one or more external PHY devices including the first external PHY device. The apparatus may further include a processor, that executes an engine, to receive a request for performance of the operation by the first external PHY device, identify an activity list associated with the first external PHY device from the one or more activity lists, identify an activity to effectuate performance of the operation from the activity list associated with the first external PHY device, and cause the first external PHY device to perform the operation in accordance with the activity.

Example 2 may include the apparatus of example 1, wherein the apparatus is a system on chip (SoC) device, and the engine is located in a firmware driver of the SoC device.

Example 3 may include the apparatus of any of the examples 1 and 2, wherein the processor is to further perform a checksum operation on data included in a header of the activity list to verify the activity list has not been corrupted, wherein causation of performance of the operation in accordance with the activity occurs in response to verification that the activity list has not been corrupted.

Example 4 may include the apparatus of example 3, wherein the checksum operation includes a CRC8 checksum operation, and wherein the data included in the header of the activity list includes a checksum value on which the CRC8 checksum operation is performed.

Example 5 may include the apparatus of any of the examples 1 and 2, wherein causation of performance of operation in accordance with the activity includes translation of one or more actions included in the activity into one or more PHY commands that cause the first external PHY device to perform the operation.

Example 6 may include the apparatus of any of the examples 1 and 2, wherein causation of performance of operation in accordance with the activity includes translation of one or more actions included in the activity into one or more media access control commands that cause the first external PHY device to perform the operation.

Example 7 may include the apparatus of any of the examples 1 and 2, wherein the memory device is further to store a table of contents associated with the activity list and the processor is further to access the table of contents, wherein identification of the activity is based on data contained in the table of contents.

Example 8 may include the apparatus of any of the examples 1 and 2, wherein a header of the activity indicates storage locations of one or more actions included in the activity, wherein the processor is further to retrieve the one or more actions from the storage locations, and wherein causation of performance of the operation in accordance with the activity includes execution of the one or more actions retrieved from the storage locations.

Example 9 may include the apparatus of example 8, wherein the processor is further to identify a first action of the one or more actions, wherein the first action includes an action call to a second action not located in the storage locations of the one or more actions included in the activity and prevent execution of the first action in response to identification of the first action that includes the action call to the second action not located in the storage locations.

Example 10 may include the apparatus of any of the examples 1 and 2, wherein the request for performance of the operation includes a PHY device indicator associated with the first external PHY device, and wherein the activity list associated with the first external PHY device is identified based, at least in part, on the PHY device indicator.

Example 11 may include one or more computer-readable media having instructions stored thereon, wherein the instructions, in response to execution by a device, cause the device to retrieve an activity, which includes one or more actions to effectuate performance of a PHY-level task by an external physical layer (PHY) device located external to the device, from an activity list stored on a memory device, the activity list associated with the external PHY device and cause the external PHY device to perform the PHY-level task in accordance with the activity.

Example 12 may include the one or more computer-readable media of example 11, wherein the instructions further cause the device to receive a request for the external PHY device to perform the PHY-level task, wherein the activity is retrieved in response to reception of the request.

Example 13 may include the one or more computer-readable media of any of the examples 11 and 12, wherein the instructions further cause the device to access a table of contents associated with the activity list, the table of contents stored on the memory device and identify the activity based on data contained in the table of contents.

Example 14 may include the one or more computer-readable media of any of the examples 11 and 12, wherein the instructions further cause the device to perform a checksum operation on data included in a header of the activity to verify that the activity has not been corrupted, wherein causation of performance of the PHY-level task in accordance with the activity occurs in response to verifying the activity has not been corrupted.

Example 15 may include the one or more computer-readable media of any of the examples 11 and 12, wherein causation of performance of the PHY-level task includes translation of the one or more actions into one or more PHY commands that effectuate performance of the PHY-level task by the external PHY device.

Example 16 may include the one or more computer-readable media of any of the examples 11 and 12, wherein causation of performance of the PHY-level task includes translation of the one or more actions into one or more media access control commands that effectuate performance of the PHY-level task by the external PHY device.

Example 17 may include the one or more computer-readable media of any of the examples 11 and 12, wherein a header of the activity indicates storage locations of the one or more actions, wherein the instructions further cause the device to retrieve the one or more actions from the storage locations, and wherein causation of performance of the PHY-level task in accordance with the activity includes execution of the one or more actions.

Example 18 may include the one or more computer-readable media of example 17, wherein instructions further cause the device to identify a first action of the one or more actions, wherein the first action includes an action call to a second action not located in the storage locations of the one or more actions and prevent execution of the first action in response to identification of the first action that includes the action call to the second action not located in the storage locations.

Example 19 may include the one or more computer-readable media of example 12, wherein the request includes a PHY device identifier associated with the external PHY device, and wherein the instructions further cause the device to identify the activity list associated with the external PHY device based on the PHY device identifier.

Example 20 may include a method to cause a physical layer (PHY) device to perform a first PHY-level task, comprising receiving, by a system on chip (SoC) device, a request to cause the PHY device to perform the first PHY-level task, the PHY device being external to the SoC device, retrieving, by the SoC device, an activity associated with the PHY-level task from an activity list associated with the PHY device, the activity list being stored in memory and including one or more activities associated with one or more PHY-level tasks including the first PHY-level task, and causing, by the SoC device, the PHY device to perform the first PHY-level task in accordance the activity.

Example 21 may include the method of example 20, further comprising performing, by the SoC device, a checksum operation on data included in a header of the activity to verify the activity has not been corrupted, wherein causation of the performance of the first PHY-level task occurs in response to verification that the activity has not been corrupted.

Example 22 may include the method of any of the examples 20 and 21, wherein causation of the performance of the first PHY-level task includes translating one or more actions included in the activity into one or more PHY commands that cause the external PHY device to perform the first PHY-level task.

Example 23 may include the method of any of the examples 20 and 21, wherein causation of the performance of the first PHY-level task includes translating one or more actions included in the activity into one or more media access control commands that cause the external PHY device to perform the first PHY-level task.

Example 24 may include the method of any of the examples 20 and 21, further comprising accessing, by the SoC device, a table of contents stored in the memory in response to reception of the request and identifying, by the SoC device, the activity based on data included in the table of contents.

Example 25 may include the method of any of the examples 20 and 21, further comprising identifying, by the SoC device, storage locations of one or more actions included in the activity based on data included in a header of the activity and retrieving, by the SoC device, the one or more actions from the storage locations, wherein causation of the performance of the first PHY-level task includes executing, by the SoC device, the one or more actions retrieved from the storage locations.

Example 26 may include the method of example 25, further comprising identifying, by the SoC device, a first action of the one or more actions, wherein the first action includes an action call to a second action not located in the storage locations of the one or more actions and preventing, by the SoC device, execution of the first action in response to identification of the first action that includes the action call to the second action not located in the storage locations.

Example 27 may include the method of example 20, wherein the request includes a PHY device identifier associated with the PHY device, and wherein the method further comprises identifying, by the SOC device, the activity list associated with the PHY device based on the PHY device identifier.

Example 28 may include an apparatus to cause a first external physical layer (PHY) device to perform an operation, comprising means for receiving a request to cause the PHY device to perform the first PHY-level task, the PHY device being external to the SoC device, means for retrieving an activity associated with the PHY-level task from an activity list associated with the PHY device, the activity list being stored in memory and including one or more activities associated with one or more PHY-level tasks including the first PHY-level task, and means for causing the PHY device to perform the first PHY-level task, through a firmware driver, in accordance the activity.

Example 29 may include the apparatus of example 28, further comprising means for performing a checksum operation on data included in a header of the activity to verify the activity has not been corrupted, wherein causation of the performance of the first PHY-level task occurs in response to verification that the activity has not been corrupted.

Example 30 may include the apparatus of any of the examples 28 and 29, wherein the means for causing of the performance of the first PHY-level task includes means for translating one or more actions included in the activity into one or more PHY commands that cause the external PHY device to perform the first PHY-level task.

Example 31 may include the apparatus of any of the examples 28 and 29, wherein the means for causing of the performance of the first PHY-level task includes means for translating one or more actions included in the activity into one or more media access control commands that cause the external PHY device to perform the first PHY-level task.

Example 32 may include the apparatus of any of the examples 28 and 29, further comprising means for accessing a table of contents stored in the memory in response to reception of the request and means for identifying the activity based on data included in the table of contents.

Example 33 may include the apparatus of any of the examples 28 and 29, further comprising means for identifying storage locations of one or more actions included in the activity based on data included in a header of the activity and means for retrieving the one or more actions from the storage locations, wherein causation of the performance of the first PHY-level task includes executing, by the SoC device, the one or more actions retrieved from the storage locations.

Example 34 may include the apparatus of example 33, further comprising means for identifying a first action of the one or more actions, wherein the first action includes an action call to a second action not located in the storage locations of the one or more actions and means for preventing execution of the first action in response to identification of the first action that includes the action call to the second action not located in the storage locations.

What is claimed is:

1. An apparatus to cause a first external physical layer (PHY) device, external to the apparatus, to perform an operation, comprising:
    a memory device to:
        store one or more activity lists associated with one or more external PHY devices including the first external PHY device; and
    a processor, that executes an engine, to:
        receive a request for performance of the operation by the first external PHY device;
        identify an activity list associated with the first external PHY device from the one or more activity lists;
        identify an activity to effectuate performance of the operation from the activity list associated with the first external PHY device; and
        cause the first external PHY device to perform the operation in accordance with the activity.

2. The apparatus of claim 1, wherein the apparatus is a system on chip (SoC) device, and the engine is located in a firmware driver of the SoC device.

3. The apparatus of claim 1, wherein the processor is to further perform a checksum operation on data included in a header of the activity list to verify the activity list has not been corrupted, wherein causation of performance of the operation in accordance with the activity occurs in response to verification that the activity list has not been corrupted.

4. The apparatus of claim 3, wherein the checksum operation includes a CRC8 checksum operation, and wherein the data included in the header of the activity list includes a checksum value on which the CRC8 checksum operation is performed.

5. The apparatus of claim 1, wherein causation of performance of operation in accordance with the activity includes translation of one or more actions included in the activity into one or more PHY commands that cause the first external PHY device to perform the operation.

6. The apparatus of claim 1, wherein causation of performance of operation in accordance with the activity includes translation of one or more actions included in the activity into one or more media access control commands that cause the first external PHY device to perform the operation.

7. The apparatus of claim 1, wherein:
    the memory device is further to store a table of contents associated with the activity list; and
    the processor is further to access the table of contents, wherein identification of the activity is based on data contained in the table of contents.

8. The apparatus of claim 1, wherein a header of the activity indicates storage locations of one or more actions included in the activity, wherein the processor is further to retrieve the one or more actions from the storage locations, and wherein causation of performance of the operation in accordance with the activity includes execution of the one or more actions retrieved from the storage locations.

9. The apparatus of claim 8, wherein the processor is further to:
    identify a first action of the one or more actions, wherein the first action includes an action call to a second action not located in the storage locations of the one or more actions included in the activity; and
    prevent execution of the first action in response to identification of the first action that includes the action call to the second action not located in the storage locations.

10. The apparatus of claim 1, wherein the request for performance of the operation includes a PHY device indicator associated with the first external PHY device, and wherein the activity list associated with the first external PHY device is identified based, at least in part, on the PHY device indicator.

11. One or more computer-readable media having instructions stored thereon, wherein the instructions, in response to execution by a device, cause the device to:
retrieve an activity, which includes one or more actions to effectuate performance of a PHY-level task by an external physical layer (PHY) device located external to the device, from an activity list stored on a memory device, the activity list associated with the external PHY device; and
cause the external PHY device to perform the PHY-level task in accordance with the activity.

12. The one or more computer-readable media of claim 11, wherein the instructions further cause the device to receive a request for the external PHY device to perform the PHY-level task, wherein the activity is retrieved in response to reception of the request.

13. The one or more computer-readable media of claim 11, wherein the instructions further cause the device to:
access a table of contents associated with the activity list, the table of contents stored on the memory device; and
identify the activity based on data contained in the table of contents.

14. The one or more computer-readable media of claim 11, wherein the instructions further cause the device to perform a checksum operation on data included in a header of the activity to verify that the activity has not been corrupted, wherein causation of performance of the PHY-level task in accordance with the activity occurs in response to verifying the activity has not been corrupted.

15. The one or more computer-readable media of claim 11, wherein causation of performance of the PHY-level task includes translation of the one or more actions into one or more PHY commands that effectuate performance of the PHY-level task by the external PHY device.

16. The one or more computer-readable media of claim 11, wherein causation of performance of the PHY-level task includes translation of the one or more actions into one or more media access control commands that effectuate performance of the PHY-level task by the external PHY device.

17. The one or more computer-readable media of claim 11, wherein a header of the activity indicates storage locations of the one or more actions, wherein the instructions further cause the device to retrieve the one or more actions from the storage locations, and wherein causation of performance of the PHY-level task in accordance with the activity includes execution of the one or more actions.

18. The one or more computer-readable media of claim 17, wherein instructions further cause the device to:
identify a first action of the one or more actions, wherein the first action includes an action call to a second action not located in the storage locations of the one or more actions; and
prevent execution of the first action in response to identification of the first action that includes the action call to the second action not located in the storage locations.

19. The one or more computer-readable media of claim 12, wherein the request includes a PHY device identifier associated with the external PHY device, and wherein the instructions further cause the device to identify the activity list associated with the external PHY device based on the PHY device identifier.

20. A method to cause a physical layer (PHY) device to perform a first PHY-level task, comprising:
receiving, by a system on chip (SoC) device, a request to cause the PHY device to perform the first PHY-level task, the PHY device being external to the SoC device;
retrieving, by the SoC device, an activity associated with the first PHY-level task from an activity list associated with the PHY device, the activity list being stored in memory and including one or more activities associated with one or more PHY-level tasks including the first PHY-level task; and
causing, by the SoC device, the PHY device to perform the first PHY-level task in accordance the activity.

21. The method of claim 20, further comprising performing, by the SoC device, a checksum operation on data included in a header of the activity to verify the activity has not been corrupted, wherein causation of the performance of the first PHY-level task occurs in response to verification that the activity has not been corrupted.

22. The method of claim 20, wherein causation of the performance of the first PHY-level task includes translating one or more actions included in the activity into one or more PHY commands that cause the external PHY device to perform the first PHY-level task.

23. The method of claim 20, wherein causation of the performance of the first PHY-level task includes translating one or more actions included in the activity into one or more media access control commands that cause the external PHY device to perform the first PHY-level task.

24. The method of claim 20, further comprising:
accessing, by the SoC device, a table of contents stored in the memory in response to reception of the request; and
identifying, by the SoC device, the activity based on data included in the table of contents.

25. The method of claim 20, further comprising:
identifying, by the SoC device, storage locations of one or more actions included in the activity based on data included in a header of the activity; and
retrieving, by the SoC device, the one or more actions from the storage locations, wherein causation of the performance of the first PHY-level task includes executing, by the SoC device, the one or more actions retrieved from the storage locations.

* * * * *

UNITED STATES PATENT AND TRADEMARK OFFICE
CERTIFICATE OF CORRECTION

PATENT NO. : 9,766,971 B2
APPLICATION NO. : 14/959440
DATED : September 19, 2017
INVENTOR(S) : Douglas D. Boom It is certified that error appears in the above-identified patent and that said Letters Patent is hereby corrected as shown below:

In the Claims

Column 20
Line 23, "...accordance the activity." should read "...accordance with the activity."

Signed and Sealed this
Twelfth Day of December, 2017

Joseph Matal
*Performing the Functions and Duties of the*
*Under Secretary of Commerce for Intellectual Property and*
*Director of the United States Patent and Trademark Office*